US012264945B2

(12) United States Patent
Welsch et al.

(10) Patent No.: US 12,264,945 B2
(45) Date of Patent: Apr. 1, 2025

(54) INDUCTIVE ROTOR POSITION SENSOR DEVICE, DRIVE DEVICE

(71) Applicant: Robert Bosch GmbH, Stuttgart (DE)

(72) Inventors: Wolfgang Welsch, Heidelberg (DE); Andreas Kurz, Bietigheim (DE); Klaus Lerchenmueller, Rettenberg (DE); Robert Dauth, Heilbronn (DE); Sina Fella, Neuenstadt (DE); Tim Krzyzanowski, Lauffen am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 23 days.

(21) Appl. No.: 17/791,887

(22) PCT Filed: Mar. 3, 2021

(86) PCT No.: PCT/EP2021/055307
§ 371 (c)(1),
(2) Date: Jul. 9, 2022

(87) PCT Pub. No.: WO2021/180535
PCT Pub. Date: Sep. 16, 2021

(65) Prior Publication Data
US 2023/0043918 A1     Feb. 9, 2023

(30) Foreign Application Priority Data
Mar. 13, 2020   (DE) ............ 10 2020 203 275.0

(51) Int. Cl.
*G01D 5/20*   (2006.01)
*G01B 7/30*   (2006.01)
*G01D 5/244*  (2006.01)

(52) U.S. Cl.
CPC ............. *G01D 5/2053* (2013.01); *G01B 7/30* (2013.01); *G01D 5/24438* (2013.01)

(58) Field of Classification Search
CPC .... G01D 5/2053; G01D 5/24438; G01D 5/20; G01D 5/2013; G01D 5/204;
(Continued)

(56) References Cited

U.S. PATENT DOCUMENTS

2002/0011838 A1*  1/2002  Miyata ................ G01D 5/2053
                                                324/207.17
2002/0011839 A1   1/2002  Miyata et al.
(Continued)

FOREIGN PATENT DOCUMENTS

CN   204293520 U   4/2015
CN   107888030 A   4/2018
(Continued)

OTHER PUBLICATIONS

International Search Report for PCT/EP2021/055307, Issued May 27, 2021.

*Primary Examiner* — Steven L Yeninas
(74) *Attorney, Agent, or Firm* — NORTON ROSE FULBRIGHT US LLP; Gerard A. Messina

(57) ABSTRACT

An inductive rotor position sensor device for detecting a rotor angular position of a rotor of an electric machine. The inductive rotor position sensor device includes a transmitter coil for generating electromagnetic waves and a receiver coil for detecting the electromagnetic waves generated by the transmitter coil and influenced by the rotor, and includes a processing unit, which is designed to activate the transmitter coil and to evaluate the electromagnetic waves detected by the receiver coil for determining the rotor angular position. The coils and the processing unit are situated on a shared circuit board. The coils are situated on a front side, and the
(Continued)

processing unit is situated on a rear side of the circuit board which faces away from the front side.

8 Claims, 4 Drawing Sheets

(58) Field of Classification Search
CPC .. G01D 5/2046; G01D 5/2073; G01D 5/2086;
G01D 5/24442; G01D 2205/50
See application file for complete search history.

(56) References Cited

U.S. PATENT DOCUMENTS

| | | | | |
|---|---|---|---|---|
| 2012/0057322 | A1* | 3/2012 | Waffenschmidt | ....... H02J 50/10 361/816 |
| 2017/0322233 | A1* | 11/2017 | Grambichler | ......... G01P 13/045 |
| 2018/0220533 | A1* | 8/2018 | Rissing | .................. G01D 5/142 |
| 2018/0321061 | A1* | 11/2018 | Rissing | .................... G01D 5/14 |
| 2019/0056244 | A1 | 2/2019 | Elliott et al. | |
| 2019/0265018 | A1* | 8/2019 | Latham | .............. G01R 33/0017 |
| 2020/0232820 | A1* | 7/2020 | Rosenegger | ............ F16C 19/22 |
| 2022/0178673 | A1* | 6/2022 | Heinemann | ............... G01D 5/20 |
| 2023/0045209 | A1* | 2/2023 | Shaga | .................. G01D 5/2046 |
| 2023/0304831 | A1* | 9/2023 | Straubinger | ......... G01D 5/2086 |

FOREIGN PATENT DOCUMENTS

| | | |
|---|---|---|
| CN | 209659691 U | 11/2019 |
| CN | 110785632 A | 2/2020 |
| CN | 110857864 A | 3/2020 |
| EP | 3355032 A1 | 8/2018 |
| EP | 3683551 A1 | 7/2020 |
| EP | 3683552 A1 | 7/2020 |
| JP | H04276517 A | 10/1992 |
| JP | 2009174925 A | 8/2009 |
| JP | 2017015696 A | 1/2017 |
| JP | 2017090431 A | 5/2017 |

* cited by examiner

INDUCTIVE ROTOR POSITION SENSOR DEVICE, DRIVE DEVICE

FIELD

The present invention relates to an inductive rotor position sensor device for detecting a rotor angular position of a rotor of an electric machine, including a transmitter coil for generating electromagnetic waves and a receiver coil for detecting the electromagnetic waves generated by the transmitter coil and influenced by the rotor, and including a processing unit, which is designed to activate the transmitter coil and to evaluate the electromagnetic waves detected by the receiver coil for determining the rotor angular position, the coils and the processing unit being situated on a shared circuit board.

The present invention furthermore relates to a drive device for a braking system of a motor vehicle, including at least one electrically operable electric machine and including an inductive rotor position sensor device assigned to the electric machine for detecting a rotor angular position of a rotor of the electric machine.

BACKGROUND INFORMATION

Inductive rotor position sensor devices are described in the related art. They take advantage of the effect that the electromagnetic waves are traceably influenced as a function of the rotor angular position of a rotor which is exposed to a field of electromagnetic waves of a transmitter coil. To activate the transmitter coil and evaluate the result detected by the receiver coil, such sensor devices regularly also include a control unit or processing unit, for example in the form of a microprocessor or an application-specific circuit. In particular, the processing unit activates the transmitter coil for generating a modulated signal. The signal received by the transmitter coil is then demodulated by the processing unit or optionally a further processing unit to enable an evaluation. The electromagnetic waves thus couple from the transmitter coil into the rotor, and from the rotor into a receiver coil, the electromagnetic signal detected by the receiver coil allowing a conclusion as to the rotor angular position. Such rotor position sensor devices are known under the term "resolver," for example.

The processing unit and the at least two coils, i.e., the transmitter coil and the receiver coil, are typically situated on the same circuit board to implement a simple electrical and/or signaling connection between the processing unit and the coil, and to obtain a compact configuration.

SUMMARY

A rotor position sensor device according to the present invention may have the advantage that it has a particularly installation space-saving design, and moreover maximally utilizes the available installation space for the coil arrangement, thereby ensuring an advantageous operation of the rotor position sensor device. According to an example embodiment of the present invention, it is provided for this purpose that the coils, i.e., the at least one receiver coil and the at least one transmitter coil, are situated on a front side of the circuit board, and the processing unit is situated on a rear side of the circuit board facing away from the front side. As a result, the circuit board is situated between the coils and the processing unit, the electrical or signaling connection of the processing unit and coils being implemented, or implementable, in a cost-effective manner, for example, by vias or the like. Due to the processing unit being situated on the rear side of the circuit board, the front side may be used completely by the coils, so that the previously available installation space is maximally utilized.

Particularly preferably, at least one shielding layer for shielding the processing unit against the electromagnetic waves is situated between the coils and the processing unit. In this way it is prevented that the electromagnetic waves are able to impair or interfere with the operation of the processing unit, despite the physical proximity between the processing unit and the coils.

Particularly preferably, the shielding layer extends over the entire front side or the entire rear side of the circuit board to ensure maximum shielding.

Furthermore, in accordance with an example embodiment of the present invention, it is preferably provided that the circuit board has a circular disk-shaped design. In this way, the circuit board and the rotor position sensor device are overall advantageously assignable to the electric machine, which in general includes a housing or a housing section, which also has a circular disk-shaped or circular ring-shaped design. In particular, the circuit board is thus situated at an end-face side of the electric machine, i.e., in a plane perpendicular to the axis of rotation of the drive shaft or of the rotor shaft of the electric machine.

Particularly preferably, in accordance with an example embodiment of the present invention, the circuit board has a circular disk ring-shaped design, so that the circuit board has a central through-opening through which, for example, the drive shaft with or without interposition of a pivot bearing is also guidable or guided, so that the circuit board is also situatable on the side of the electric machine which is assigned to a consumer drivable by the drive shaft. The circuit board is preferably situated on the side of the electric machine which faces away from the consumer.

According to one preferred refinement of the present invention, the shielding layer has multiple slots, in particular, multiple radial slots. Due to the slotted configuration, the shielding layer includes multiple slots, which preferably each extend in a straight line, and particularly preferably are radially oriented, to implement the radially slotted configuration. As a result of the slots, it is achieved that a signal amplitude of the rotor position sensor device is attenuated only minimally, in particular, less than 10%, by eddy currents arising in the shielding layer. Due to the slots, as high as possible a number of segments of the shielding layer is preferably created or implemented by the slots, so that the attenuation is minimized.

According to one preferred refinement of the present invention, the circuit board includes a further shielding layer, the two shielding layers in each case being designed to have multiple slots and to be situated indirectly or directly on top of one another in such a way that none of the slots overlap. As a result, no shielding layer-free area is present, as seen in an axial top view onto the circuit board. The shielding layers may be situated on the same side of the circuit board, for example on the front side or on the rear side, or one of the shielding layers is situated on the front side, and the other of the shielding layers is situated on the rear side of the circuit board. Particularly preferably, the respective shielding layer is designed as an inner layer or inner ply of the circuit board itself. In this way, the circuit board may, for example, include four, six or more layers, for example two outer layers and four inner layers, of which, in particular, one or two is/are designed as shielding layer(s). In particular, the two shielding layers have a radially slotted design and are rotated with respect to one another in such a way that no slots of the two shielding layers overlap, so that a continuous shielding layering results in a top view onto the circuit board.

According to one preferred specific embodiment of the present invention, the respective shielding layer is designed as an inner layer of the circuit board, as was already mentioned above. For this purpose, during the manufacturing process of the multi-layer circuit board, the respective shielding layer is lithographically applied as an inner layer and is etched out of a copper cladding of the inner layers of the circuit board.

Furthermore, it is preferably provided that the circuit board is designed as a circuit board which is cut free in a rectangular base circuit board and connected in one piece to the rectangular circuit board by only one web or by multiple, in particular, a maximum of four, web(s) and able to be broken out of the same by destruction of the webs. Since circuit boards are usually present in a rectangular shape, the circuit board is also easily implementable in a cost-effective manner in a mass production due to the circular or circular ring-shaped cutting free of the circuit board. The rectangular base plate additionally has the advantage that, for test purposes, the rotor position sensor device is more easily introducible into a testing device which is usually configured for rectangular objects. The base circuit board is, in particular, a panel in which multiple of the circuit boards are designed detachably, in particular, in a manner in which they can be broken out.

A drive device according to the present invention includes the rotor position sensor device according to the present invention. This results in the aforementioned advantages.

The present invention is to be explained in greater detail hereafter based on the figures.

DETAILED DESCRIPTION OF EXAMPLE EMBODIMENTS

Figure 1:
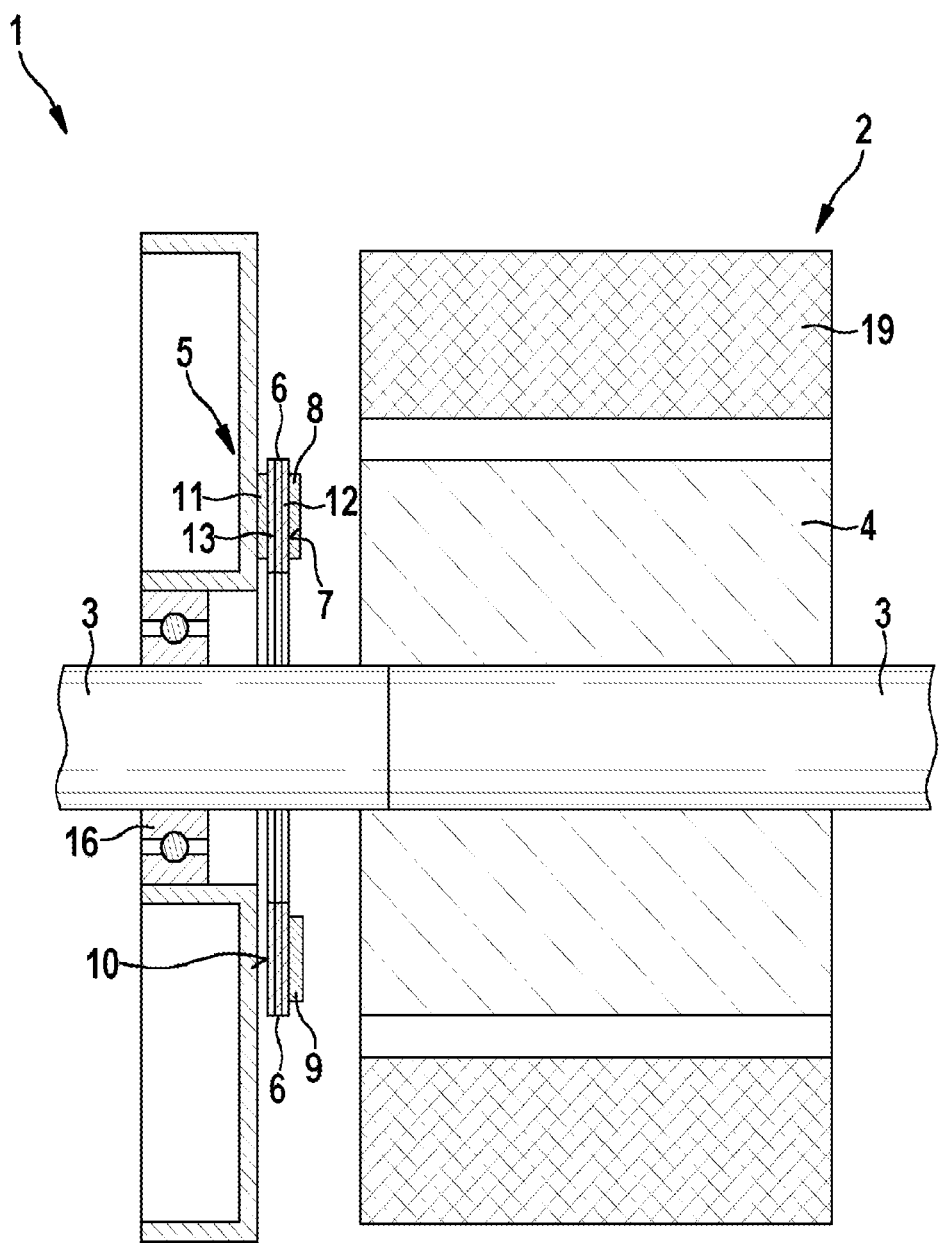
FIG. 1 shows an advantageous drive device in a simplified illustration, in accordance with an example embodiment of the present invention.

FIG. 1, in a simplified illustration, shows an advantageous drive device 1 for a consumer which is not shown in greater detail here, for example a braking system of a motor vehicle. Drive device 1 includes an electric machine 2 including a drive shaft 3, which is rotatably mounted in a housing, which is not shown here, and carries a rotor 4, to which a stator 19 which is fixed to the housing is assigned. Drive shaft 3 is coupled or couplable to the consumer to drive it.

A rotor position sensor device 5, which detects a rotor angular position of rotor 4 by induction, is assigned to rotor 4 of electric machine 2. For this purpose, rotor position sensor device 5 includes a circuit board 6, which according to the present exemplary embodiment has a circular ring disk-shaped design and is situated coaxially to drive shaft 3, assigned to an end-face side of rotor 4. On its front side 7 facing rotor 4, circuit board 6 carries at least one transmitter coil 8 as well as at least one receiver coil 9. A processing unit 11, which according to the present exemplary embodiment is designed as an application-specific integrated circuit (ASIC) and is electrically connected to the two coils 8, 9, is situated on rear side 10 of circuit board 6 which faces away from rotor 4.

Processing unit 11 is designed to activate transmitter coil 7 to emit a signal with the aid of electromagnetic waves, which penetrates rotor 4. The electromagnetic waves are influenced by rotor 4 and are reflected or conducted to receiver coil 9, they being influenced as a function of the rotation angle position of rotor 4. Processing unit 11 is designed to demodulate the signal detected by receiver coil 9 and influenced by rotor 4 and to detect the rotor angular position of rotor 4 as a function of the detected signal. Methods for determining the rotor angular position with the aid of an inductive rotor position sensor device, which generally is also referred to as an inductive rotor position sensor, in particular, a high frequency sensor, are conventional in general so that the specific function and execution of the method are not to be addressed at this point.

Due to processing unit 11 being situated on rear side 10 and coils 8, 9 being situated on front side 7 of circuit board 6, it is achieved that the surface of front side 7 which faces rotor 4 may overall be filled by coils 8, 9, thereby maximizing the coil size. Usually, the coil size is thus limited in that the circuit board only has a limited space available in the housing of electric machine 2, and, in addition to coils 8, 9, processing unit 11 or multiple such processing units 11 also have to be situated on the circuit board. Due to the now advantageous arrangement, however, the installation space on the surface of front side 7 facing rotor 4 is maximally utilized by coils 8, 9, thereby achieving an advantageous detection result of the rotor angular position.

Advantageously, one or multiple shielding layer(s) 12, 13 is/are situated between processing unit 11 on the one hand, and coils 8, 9 on the other hand. According to the present exemplary embodiment, shielding layers 12, 13 are designed as layers of circuit board 6. In particular, shielding layers 12, 13 are manufactured as inner layers and separate high frequency areas, such as transmitter and receiver coils 8, 9 on front side 7, from the electrical components on rear side 10 of circuit board 6. In particular, shielding layers 12, 13 are lithographically applied as inner layers and etched out of a copper cladding.

Figure 2A:
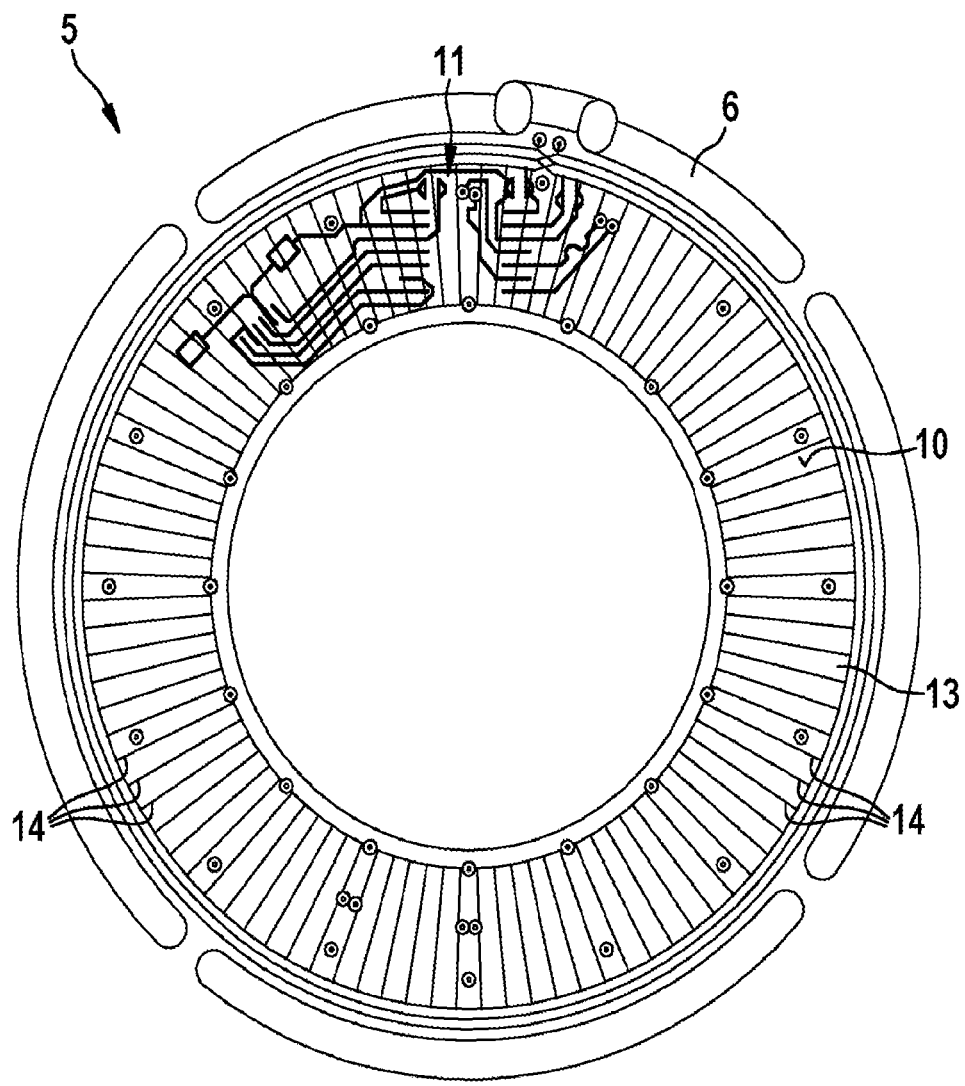
FIGS. 2A and 2B show an advantageous rotor position sensor device of the drive device in different views, in accordance with an example embodiment of the present invention.
Figure 2B:
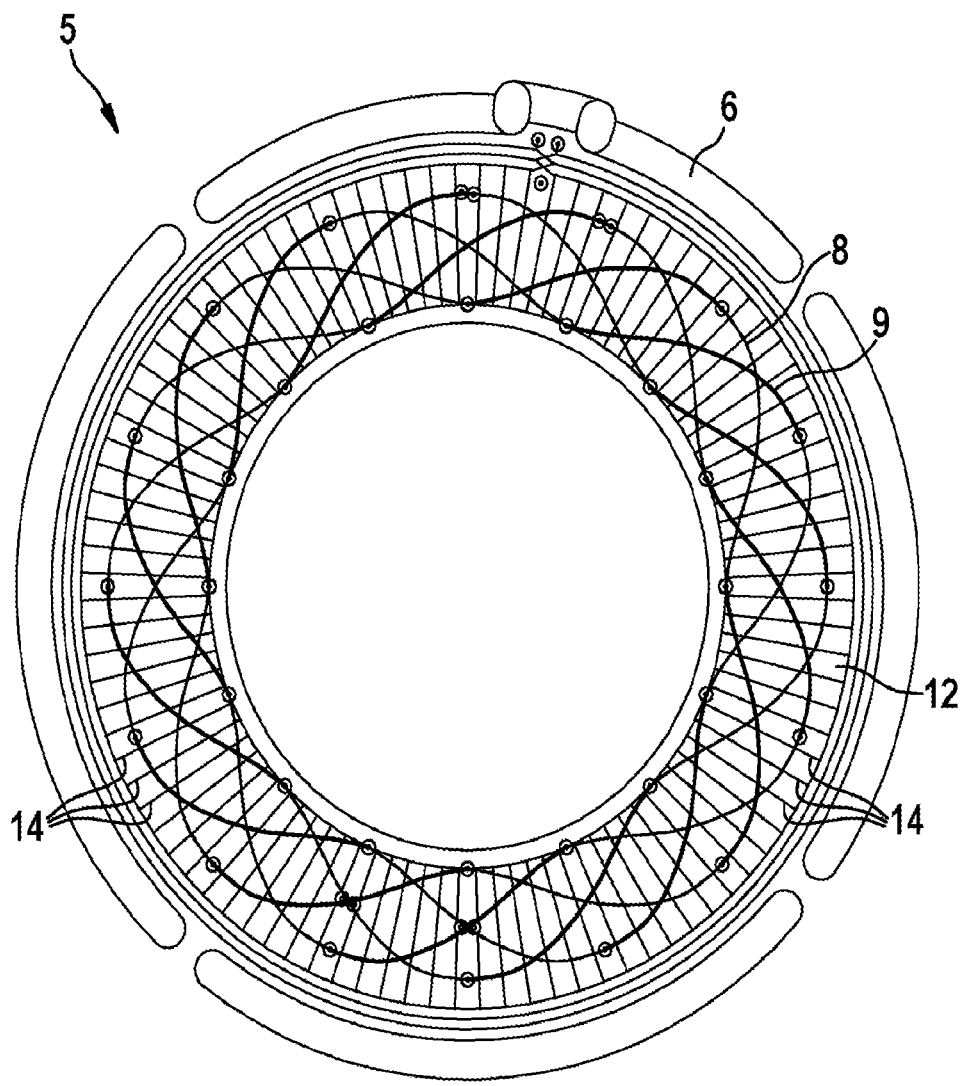

FIGS. 2A and 2B show rotor position sensor device 5 in a top view onto rear side 10 in FIG. 2A, and in a top view onto front side 7 in FIG. 2B.

As is apparent in FIGS. 2A and 2B, shielding layers 13 and 12 in each case have a radially slotted design so that radial ring disk segments of the respective shielding layer 12, 13 result, which are separated from one another by a respective slot 14 which extends radially. Slots 14 preferably do not extend completely through the respective shielding layer 12, 13 in the radial extension, but preferably over the essential radial extension, i.e., almost over the entire radial width. In the process, according to the present exemplary embodiment, shielding layers 12, 13 are slotted equally so that they include the same number of slots 14 and circular ring segments. Moreover, shielding layers 12, 13 are situated at circuit board 6 rotated with respect to one another in such a way that, in the top view, slots 14 of shielding layers 12, 13 do not overlap or coincide anywhere, so that an overall continuous shielding results, which is situated between processing unit 11 and coils 8, 9.

In this way, it is ensured that an offset and a symmetry of the coil signals are minimized. Shielding layers 12 and 13 in each case preferably extend over the entire circuit board 6, so that no strip conductors present on circuit board 6 go beyond shielding layers 12, 13.

Due to the slotted design of shielding layers 12, 13, it is achieved that a signal amplitude is attenuated only minimally, in particular, less than 10%, by eddy currents arising in the respective shielding layer 12, 13. According to the further exemplary embodiment, rotor position sensor device 5 optionally only includes one of shielding layers 12 or 13; however then, preferably not slotted, but continuous.

Figure 3:
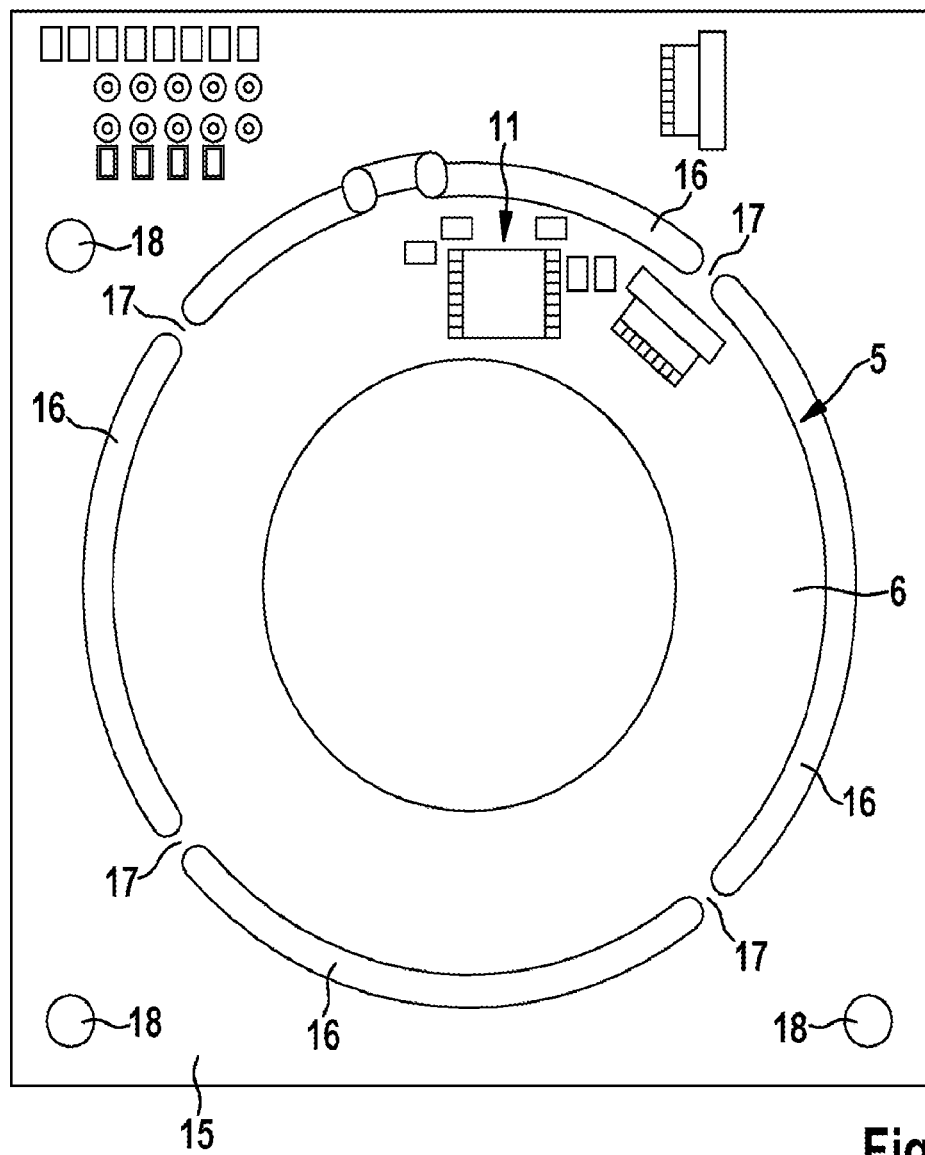
FIG. 3 shows an optional refinement of the rotor position sensor device, in accordance with an example embodiment of the present invention.

FIG. 3 shows a further advantageous exemplary embodiment of rotor position sensor device 5, which differs from the preceding exemplary embodiment in that circular ring-shaped circuit board 6 is integrated into a rectangular base circuit board 15. Circuit board 6 is separated from base circuit board 15 by circular ring segment-shaped cut-outs 16 in such a way that four connecting webs 17 remain, which are connected in one piece both to base circuit board 15 and to circuit board 6. Connecting webs 17 are selected to be so narrow that circuit board 6 may be easily broken out of base circuit board 15. In this way, a simple manufacture of rotor sensor position device 5 is made possible. Additionally, the rectangular configuration of base circuit board 15 allows rotor position sensor device 5 to be easily attached on a conventional test bench, the attachment on the test bench being possible, for example, via the three openings 18 shown in FIG. 3, which are usable for aligning and, for example, accommodating a fastening screw.

What is claimed is:

1. An inductive rotor position sensor device for detecting a rotor angular position of a rotor of an electric machine, the inductive rotor position sensor device comprising:
    a transmitter coil configured to generate electromagnetic waves;
    a receiver coil configured to detect the electromagnetic waves generated by the transmitter coil and influenced by the rotor;
    a processing unit configured to activate the transmitter coil and to evaluate the electromagnetic waves detected by the receiver coil for determining the rotor angular position; and
    a rigid multi-layer circuit board comprising two outer layers, namely a front side and a rear side which faces away from the front side, and several inner layers, the transmitter and receiver coils and the processing unit being situated on the circuit board, wherein the transmitter and receiver coils are situated on the front side of the circuit board, and the processing unit is situated on the rear side of the circuit board, wherein:
        at least one shielding layer for shielding the processing unit against the electromagnetic waves is situated between the coils and the processing unit,
        a further shielding layer rests on the at least one shielding layer, each of the further shielding layer and the at least one shielding layer have multiple slots and are configured to be situated on top of one another in such a way that none of the slots overlap, and
        the shielding layers are lithographically applied as inner layers to the circuit board and etched out of a copper cladding.

2. The rotor position sensor device as recited in claim 1, wherein the shielding layer extends over the entire circuit board.

3. The rotor position sensor device as recited in claim 1, wherein the circuit board has a circular disk-shape configuration.

4. The rotor position sensor device as recited in claim 1, wherein the circuit board has a circular disk ring-shape configuration.

5. The rotor position sensor device as recited in claim 1, wherein the shielding layer has multiple radial slots.

6. The rotor position sensor device as recited in claim 1, wherein the shielding layer is manufactured from copper cladding.

7. The rotor position sensor device as recited in claim 1, wherein the circuit board is a circuit board which is cut free in a rectangular base circuit board and connected in one piece to the rectangular base circuit board by only one web or by a maximum of four webs and able to be broken out of by destruction of the webs.

8. A drive device for a parking brake of a motor vehicle, comprising:
    an electric machine; and
    an inductive rotor position sensor device assigned to the electric machine for detecting a rotor angular position of a rotor of the electric machine, the rotor angular position sensor including:
        a transmitter coil configured to generate electromagnetic waves,
        a receiver coil configured to detect the electromagnetic waves generated by the transmitter coil and influenced by the rotor, and
    a processing unit configured to activate the transmitter coil and to evaluate the electromagnetic waves detected by the receiver coil for determining the rotor angular position; and
    a rigid multi-layer circuit board comprising two outer layers, namely a front side and a rear side which faces away from the front side, and several inner layers, the transmitter and receiver coils and the processing unit being situated on the circuit board, wherein the transmitter and receiver coils are situated on the front side of the circuit board, and the processing unit is situated on the rear side of the circuit board, wherein:
        at least one shielding layer for shielding the processing unit against the electromagnetic waves is situated between the coils and the processing unit,
        a further shielding layer rests on the at least one shielding layer, each of the further shielding layer and the at least one shielding layer have multiple slots and are configured to be situated on top of one another in such a way that none of the slots overlap, and
        the shielding layers are lithographically applied as inner layers to the circuit board and etched out of a copper cladding.

* * * * *